(12) United States Patent
Collins et al.

(10) Patent No.: US 10,799,408 B2
(45) Date of Patent: *Oct. 13, 2020

(54) ADHESIVE PATCH AND METHOD OF USING THE SAME

(71) Applicant: SURFACE MEDICAL INC., Calgary (CA)

(72) Inventors: Thomas Collins, Calgary (CA); Michael Drew Urquhart, Calgary (CA); Barbara Jeanne LaCoste Potter, Calgary (CA); Jeffrey Miles Schacter, Calgary (CA); Sean Peter Burnand, Calgary (CA); Bruce Stewart Fogel, Calgary (CA); Iwain Lam, Calgary (CA)

(73) Assignee: Surface Medical Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,135

(22) Filed: Sep. 11, 2019

(65) Prior Publication Data

US 2020/0000662 A1    Jan. 2, 2020

Related U.S. Application Data

(63) Continuation of application No. 14/002,246, filed as application No. PCT/CA2012/000195 on Mar. 5, 2012, now Pat. No. 10,434,021.

(60) Provisional application No. 61/449,389, filed on Mar. 4, 2011.

(51) Int. Cl.

| B32B 43/00 | (2006.01) |
| A61G 7/05 | (2006.01) |
| C09J 7/22 | (2018.01) |
| B29C 73/10 | (2006.01) |

(52) U.S. Cl.
CPC ........... *A61G 7/05* (2013.01); *B29C 73/10* (2013.01); *B32B 43/00* (2013.01); *C09J 7/22* (2018.01); *C09J 2201/622* (2013.01); *C09J 2433/00* (2013.01); *C09J 2475/006* (2013.01); *Y10T 428/20* (2015.01); *Y10T 428/24959* (2015.01)

(58) Field of Classification Search
CPC ....... B29C 73/10; B32B 43/00; Y10T 428/20; Y10T 428/24959
See application file for complete search history.

(56) References Cited

U.S. PATENT DOCUMENTS

| 3,743,616 A | 7/1973 | Kest |
| 4,310,509 A | 1/1982 | Berglund et al. |
| 4,889,234 A | 12/1989 | Sorensen et al. |
| 5,088,483 A * | 2/1992 | Heinecke ............... A61F 13/023 128/849 |
| 5,190,609 A | 3/1993 | Lin et al. |
| 5,300,171 A | 4/1994 | Braun et al. |
| 5,558,913 A | 9/1996 | Sasaki et al. |
| 5,643,648 A | 7/1997 | Kobe et al. |
| 6,294,237 B1 | 9/2001 | Popat |
| 6,684,890 B2 | 2/2004 | Nicolosi et al. |
| 2003/0031687 A1 | 2/2003 | Falder et al. |
| 2004/0001948 A1 | 1/2004 | Mussig et al. |
| 2007/0264458 A1 | 11/2007 | Luna et al. |
| 2010/0104791 A1* | 4/2010 | Baudrion ............... A01N 25/34 428/41.8 |

FOREIGN PATENT DOCUMENTS

| DE | 43 00 922 A1 | 7/1994 |
| EP | 1094945 B1 | 5/2004 |

OTHER PUBLICATIONS

Australian First Examination Report, Australian Application No. 2012225165, dated May 11, 2015, 4 pages.
European Communication Pursuant to Rules 70(2) and 70a(2) EPC, European Application No. 12755046.5, dated Jun. 12, 2015, 1 page.
European Extended Search Report, European Application No. 12755046. 5, dated May 27, 2015, 9 pages.
PCT International Search Report and Written Opinion, PCT Application No. PCT/CA2012/000195, dated Jun. 18, 2012, 13 pages.
European Examination Report, European Application No. 12755046. 5, dated Dec. 20, 2017, 7 pages.
"Peel Adhesion of Pressure Sensitive Tape," Harmonized International Standard, Issued Oct. 2000, Revised May 2007, pp. 101-1-101-10.
Bentley, D.J., "Permanent & Removable Pressure-Sensitive Adhesives," Aug. 1, 2003, © 2017, YTC Media, 3 pages, [Online] [Retrieved on Apr. 13, 2018] Retrieved from the Internet<URL:http://pffc-online.com/magazine/865-paper-permanent-removable-pressuresensitive>.
"Permanent Adhesive is Defined Here as a Labeling Term | Permanent Adhesive | Labelplanet," Label Planet Ltd., undated, 1 page, [Online] [Retrieved on Jan. 10, 2017] Retrieved from the Internet<https://www.labelplanet.co.uk/glossary-of-label-terms/adhesive-permanent.php>.
"Types of Pressure Sensitive Adhesives," 8 pages, undated, [Online] [Retrieved on Apr. 13, 2018] Retrieved from the Internet <URL:http://www.thomasnet.com/articles/adhesives-sealants/types-of-pressure-sensitive-adhesives>.
"Removable labels vs. permanent labels," Online Labels, Inc., 2018, 3 pages [Online] [Retrieved on Apr. 13, 2018] Video May be Retrieved from the Internet<URL: https://www.onlinelabels.com/Videos/removable-labels-vs-permanent-labels.htm>.

* cited by examiner

*Primary Examiner* — Lawrence D Ferguson
(74) *Attorney, Agent, or Firm* — Perkins Coie LLP; Viola Kung

(57) ABSTRACT

The disclosure provides, in part, adhesive patches for repairing damaged surfaces of health care devices. In one of its aspects the disclosure provides a method of repairing the surface of health care device by applying an adhesive patch over a damaged portion of the surface, the patch comprising a film layer and an adhesive layer. In another one of its aspects, the disclosure provides an adhesive patch for repairing the surface of a health care device comprising a film layer and an adhesive layer.

11 Claims, 3 Drawing Sheets

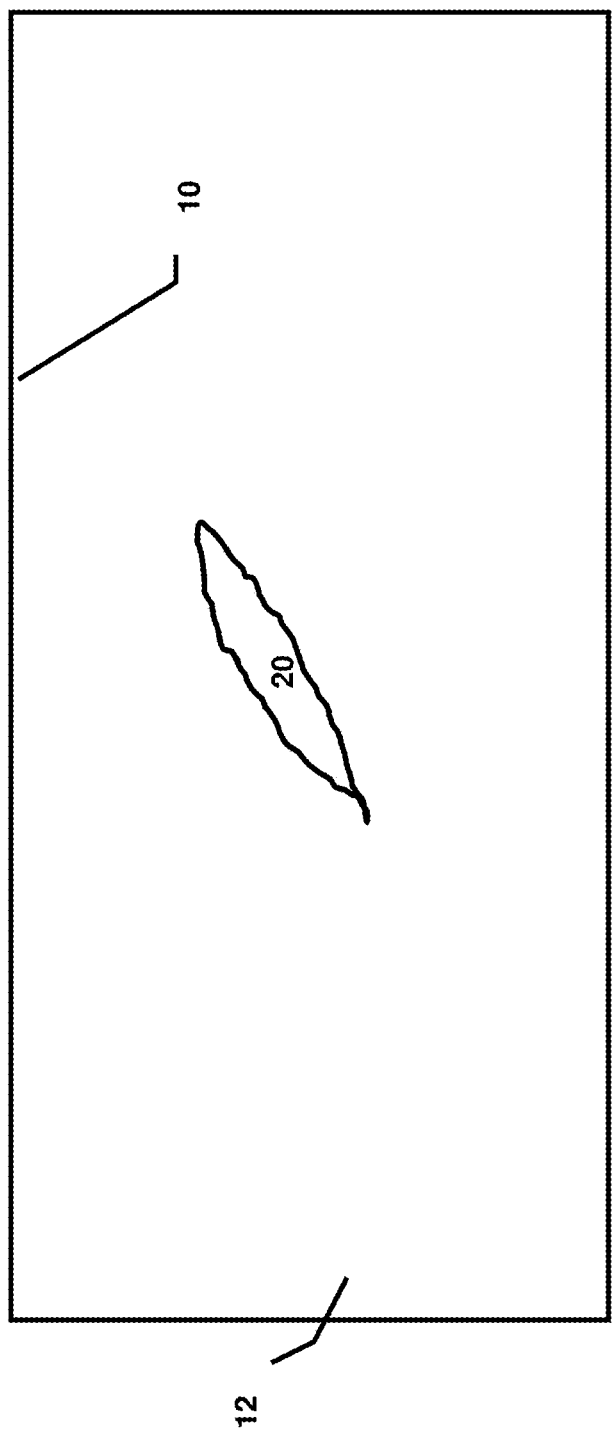
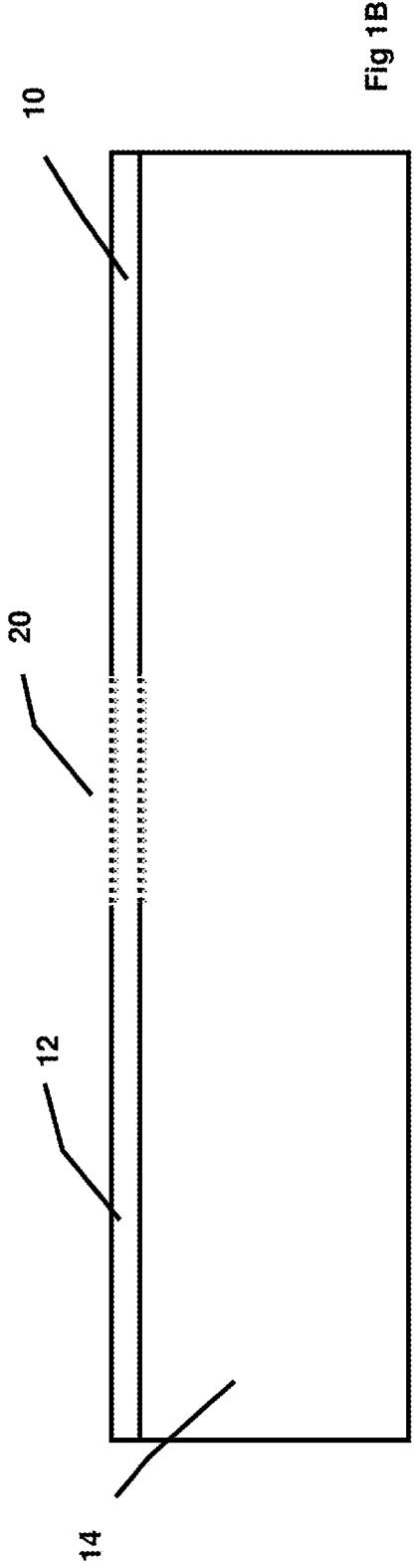

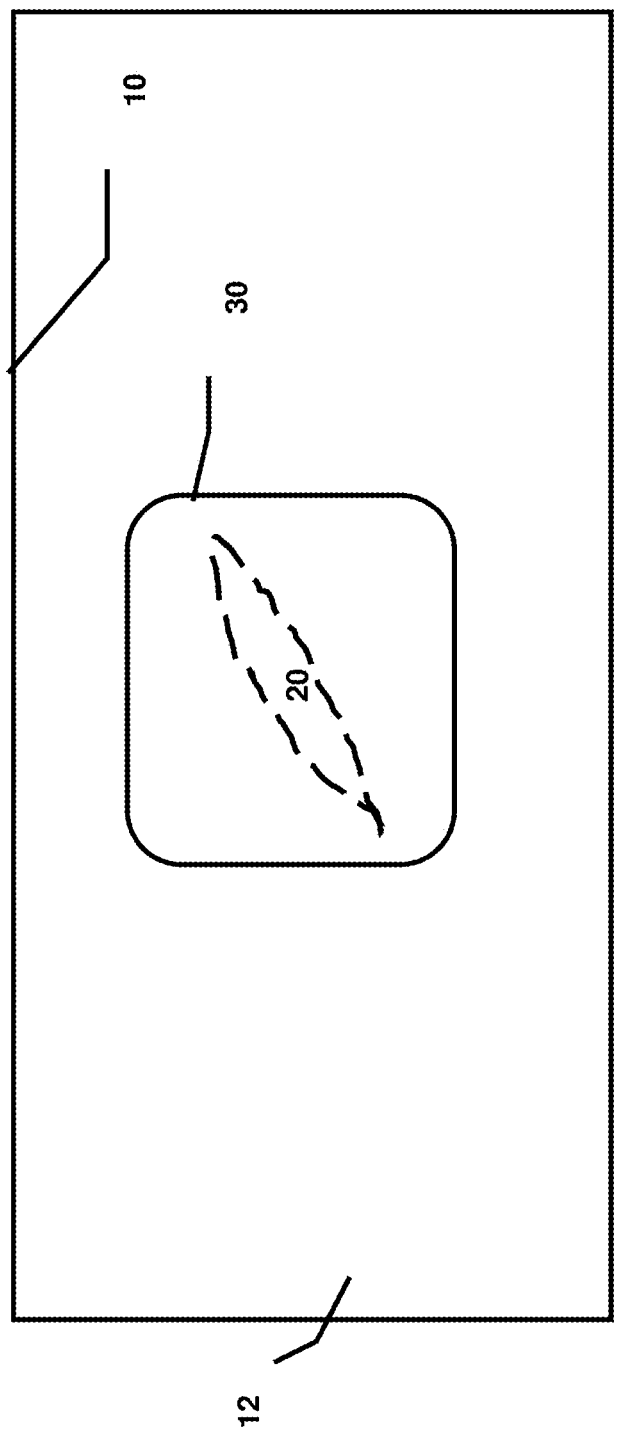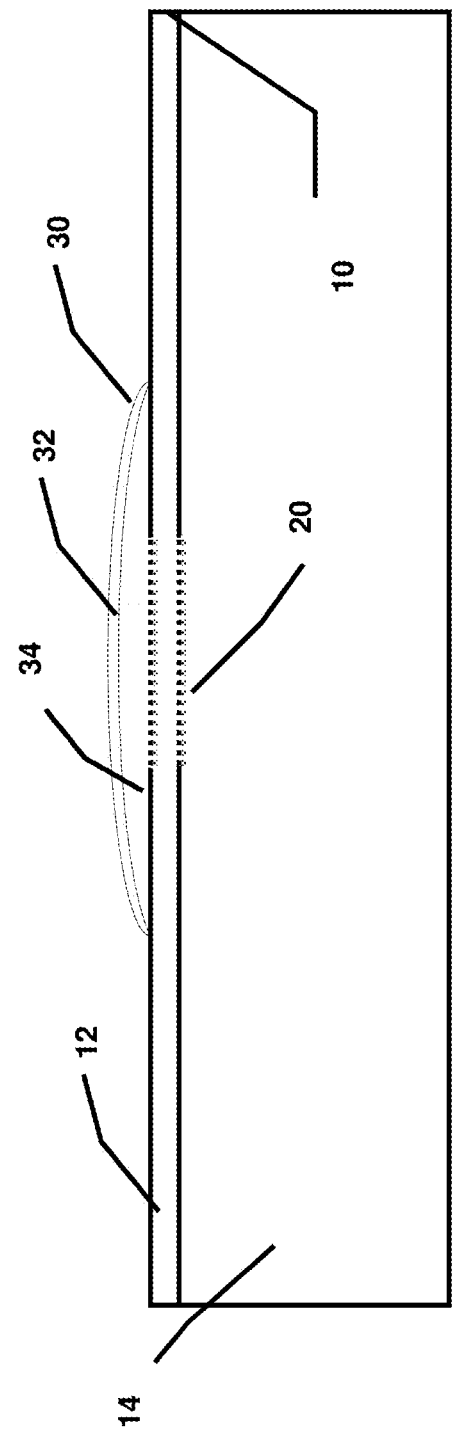

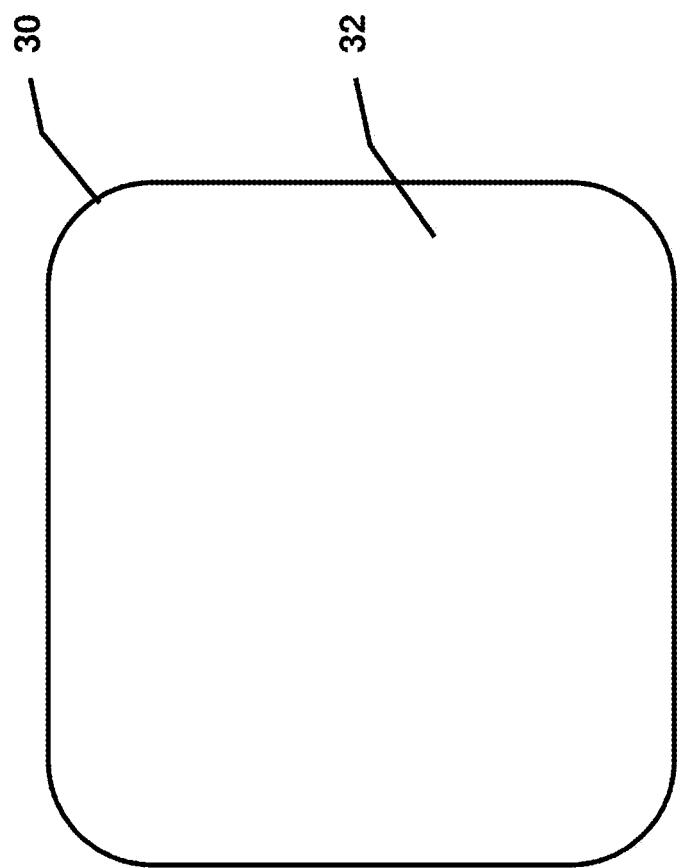
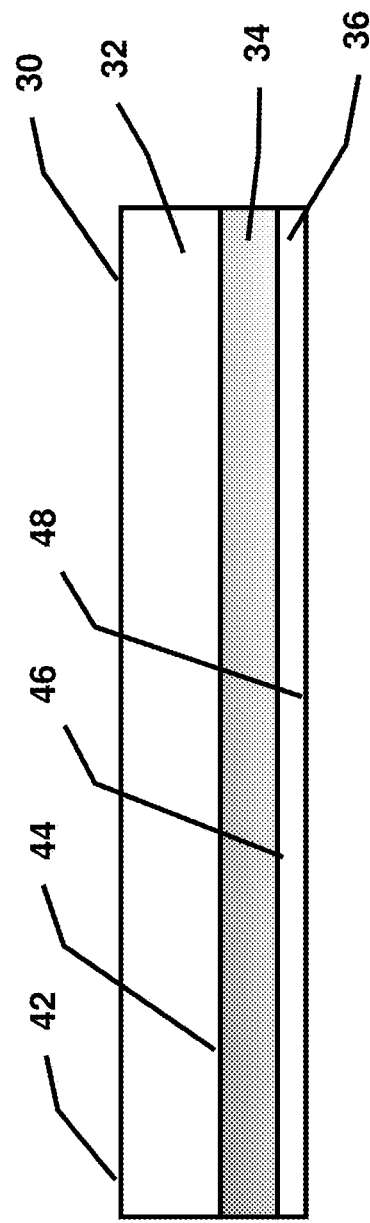
Fig 3A
Fig 3B

ADHESIVE PATCH AND METHOD OF USING THE SAME

This application is a continuation of U.S. application Ser. No. 14/002,246, filed Nov. 6, 2013; which is a 371 national phase of PCT/CA2012/000195, filed Mar. 5, 2012; which claims the priority of U.S. Provisional Application No. 61/449,389, filed Mar. 4, 2011. The contents of the above-identified applications are incorporated herein by reference in their entireties.

FIELD

The present disclosure generally relates to adhesive patches, for example, patches for repairing damaged surfaces of health care devices.

BACKGROUND

A typical health care device undergoes significant use and wear throughout its lifespan. Damage to the surface of the health care device, such as, tears, punctures, rips, burns, wear, cracks, and other surface damage, is unattractive, unsanitary and presents potential health risks. Increasingly, health care providers are becoming aware of the role that contaminated environmental surfaces play in the transmission of pathogens. Patient care initiatives, particularly infection control efforts, are becoming more prevalent. At least 30% of health care associated infections can be prevented by following infection prevention and control strategies (Haley R W, Culver D H, White J W, Morgan W M, et al. (1985) The nationwide nosocomial infection rate: a new need for vital statistics. Am J Epidemiol. Vol. 121:159-67). One challenge in cleaning or disinfecting the surfaces of health care devices is the occurrence of small tears and other damage to the surface of the device. Not only is routine cleaning of health care devices suboptimal, but damaged surfaces typically cannot be fully cleaned or disinfected thereby creating a potential reservoir for infectious agents.

Health care devices used in hospital environments have been found to be a source of health care associated infections. Environmental microbiological surveys have indicated that hospital devices (for example, beds, tables, stools, wheelchairs, racks, trolleys, stretchers, mattresses, catheter-bag, and other furniture, equipment and articles used in a hospital environment) can be contaminated with pathogens at a higher incidence relative to other surfaces (see, for example, Rampling A, Wiseman S, Davis L., et al. (2001) Evidence that hospital hygiene is important in the control of methicillin-resistant Staphylococcus aureus. J Hosp Infect. Vol. 49:109-116; and Blythe D, Keenlyside D, Dawson S J, Galloway A. (1998) Environmental contamination due to methicillin-resistant Staphylococcus aureus. J Hosp Infect. Vol. 38:67-70). In addition, there have been reports of hospital mattresses contaminated with infectious agents, including for example, Pseudomonas aeruginosa, methicillin-resistant Staphylococcus aureus (MRSA), vancomycin-resistant Enterococci (VRE), Acinetobacter, and other fungal and viral pathogens. Hospital mattresses damaged by extensive use, tears and sharp objects, such as needles, may create a potential reservoir for infectious agents and a portal for entry and exit of infectious agents. Several studies have demonstrated that damaged mattresses have had a role in outbreaks, the transmission of disease to patients, and in some cases patient death (see Creamer E, Humphreys H. (2008) The contribution of beds to healthcare-associated infection: the importance of adequate decontamination, J Hosp Infect. Vol. 69:8-23; Sherertz R J, Sullivan M L. (1985) An outbreak of infections with Acinetobactercalcoaceticus in burn patients: contamination of patients' mattresses. J Infect Dis. Vol. 151:252-258; Moore E P, Williams E W. (1991) A maternity hospital outbreak of methicillin resistant Staphylococcus aureus. J Hosp Infect. Vol. 19:5-16; Ndawula E M, Brown L. (1991) Mattresses as reservoirs of epidemicmethicillin-resistant Staphylococcus aureus. Lancet. Vol. 337:488; Fujita K, Lilly H A, Kidson A, Ayliffe G A. (1981) Gentamicin resistant Pseudomonas aeruginosa infection from mattresses in a burns unit. Br Med J. Vol. 283:219-220; Robertson M H, Hoy G, Peterkin I M. (1980) Anti-static mattress as a reservoir of Pseudomonas infection. Br Med J. Vol. 280:831-832; and O'Donoghue M A, Allen K D. (1992) Costs of an outbreak of wound infection in an orthopaedic ward. J Hosp Infect. Vol. 22:73-79). These studies discuss that damaged hospital mattresses may harbor infectious agents and result in nosocomial infections, and intact mattresses or health care devices are preferred for appropriate cleaning, disinfection and infection prevention and control.

As a result, many health care providers have instituted policies requiring the replacement of health care devices having damaged surfaces or the replacement of the damaged components of the device. However, replacement of a health care device or its damaged components can be costly, may result in equipment downtime, and the likelihood of a tear or other surface damage occurring after replacement is high. Thus many health care devices are left in a damaged state.

Prior art solutions exist to repair damaged surfaces of a variety of non-medical devices. In one solution, ready-mix glue is applied to the damaged portion of the surface. However, this solution tends to be messy, leaves the surface temporarily out of service, and may create toxic fumes or be toxic through direct contact. In another solution, duct or other types of tape are applied to the damaged portion of the surface. However, the edges of the tape tend to breakdown after extended use or following the application of liquids or body fluids. These edges can be difficult to clean properly, thereby, creating an additional potential reservoir for infectious agents.

SUMMARY

The disclosure provides, at least in part, adhesive patches for repairing damaged surfaces of health care devices.

In certain aspects the disclosure provides a method of repairing the surface of health care device by applying an adhesive patch over a damaged portion of the surface, the patch comprising a film layer and an adhesive. In certain aspects, the disclosure provides an adhesive patch for repairing the surface of a health care device comprising a film layer and an adhesive.

The film layer may comprise one or more of the following properties: adhesion or bonding to the adhesive or interlayer, anti-decubitus, heat-resistance, resistance to ultraviolet radiation, durability, flexibility, stretchable, breathability, cleanability, resistance to chemical cleaning products; anti-microbial properties, hypoallergenic and non-cytotoxic properties.

The adhesive may comprise one or more of the following properties: adhesion to film layer or interlayer and device surface, heat-resistance, pressure-resistance, resistance to ultraviolet radiation, durability, flexibility, cleanability, resistance to chemical cleaning products; plasticizer resistant, anti-microbial, hypoallergenic and non-cytotoxic properties.

As used herein, the term 'patch' refers to articles having a size and adhesion characteristics suitable for affecting a durable repair to health care devices such as, for example, mattresses used in hospital beds. In certain embodiments, the patches are generally planar in shape with a film layer and an adhesive layer.

As used herein, "a" or "an" means "at least one" or "one or more".

This summary does not necessarily describe all features of the invention. Other aspects, features and advantages of the invention will be apparent to those of ordinary skill in the art upon review of the following description of specific embodiments of the invention.

BRIEF DESCRIPTION OF THE DRAWINGS

FIG. 1A is a top plan view of a health care device having a damaged surface.

FIG. 1B is a side elevation view of the health care device shown in FIG. 1A.

FIG. 2A is a top plan view of the health care device shown in FIGS. 1A and 1B having an adhesive patch applied to the damaged portion of the surface of the health care device.

FIG. 2B is a side elevation view of the health care device shown in FIGS. 1A and 1B having an adhesive patch applied to the damaged portion of the surface of the health care device.

FIG. 3A is top plan view of the patch shown in FIGS. 2A and 2B.

FIG. 3B is side elevation view of the patch shown in FIGS. 2A and 2B.

DETAILED DESCRIPTION

The present adhesive patches comprise a film layer and an adhesive.

The film layer may be any suitable substance. For example, the film layer may comprise a thermoplastic or thermosetting polymer or a combination of polymers. Examples of thermoplastic polymers include, but are not limited to, polyacetals, polyolefins, polyacrylics, polycarbonates, polystyrenes, polyesters, polyamides, polyvinyl, polysulfonates, polysulfides, polythioesters, polysulfones, polysulfonamides, polyureas, polyurethane, or the like, and combinations thereof. The present film layer may comprise a polyethylene, polyurethane, polypropylene, nylon, silicone, polyamide, polyester, polyvinyl, or the like, or combinations thereof. Preferably the film layer comprises a polyvinyl, polyurethane, or the like. Such films are available commercially from a variety of sources, such as, for example Dartex Coatings Inc. (Nottingham, UK), DermaMed Coatings Company LLC. (Ohio, USA), Argotec Inc. (Massachusetts, USA), Flexcon Inc. (Massachusetts, USA), ETC Technologies Inc. (Massachusetts, USA), and Medical Adhesive Tape Technologies Inc. (New York, USA). Films available from Dartex Coatings may include, but not limited to, DartexTC84. Films available from DermaMed Coatings Company may include, but not limited to, DermaMed4 mil PU. Films available from Argotec may include, but not limited to, Argotec2 mil PU. Films available from Flexcon may include, but not limited to, FlexconV400 and V600. Films available from ETC Technologies may include, but not limited to, ETC 2 mil, 3 mil, 4 mil, and 6 mil. Films available from Medical Adhesive Tape Technologies may include, but not limited to, M.A.T.T. 2.5 GA PU, M.A.T.T. 3.0 GA Vinyl, and M.A.T.T. 3.5 GA vinyl. The film layer may be non-cytotoxic, hypoallergenic, resistant to bacterial growth, or a combination thereof. The film layer may have a dyne level of 36 dynes/cm or greater, 37 dynes/cm or greater, 38 dynes/cm or greater, 39 dynes/cm or greater, 40 dynes/cm or greater, for the side that will come into contact with the adhesive in the final construction.

Any suitable adhesive may be used herein. For example, pressure-sensitive adhesives (PSA), permanent adhesives, adhesives that cure with time, light-activated adhesives that cure with electromagnetic energy such as UV or visible light, or heat-activated adhesives may be used. The adhesive may be non-cytotoxic, hypoallergenic, resistant to bacterial growth, or a combination thereof. The adhesive may be in the form of an adhesive layer.

A pressure-sensitive adhesive may comprise polyurethane, silicone polymer, or other synthetic polymer based adhesive, and may or may not be cross-linked. Adhesives are available commercially from, for example, Adchem Inc. (New York, USA), 3M Canada Inc. (Ontario, Canada). Flexcon Inc. (Massachusetts, USA), and Medical Adhesive Tape Technologies Inc. (New York, USA). Adhesives from Adchem may include, but not limited to, Adchem 7833, Adchem 653, Adchem 7603, Adchem 7854, Adchem 7333 and Adchem 730. Adhesives from 3M may include, but not limited to, 3M9465. Adhesives from Flexcon may include, but not limited to, Flexmark TT200. Adhesives from Medical Adhesive Tape Technologies may include, but not limited to, COL-RZ002, COL-ACR003 and COL-ACR007.

In certain aspects, the present patches preferably are able to elongate at least 30%. For example, 31% or more, 32% or more, 33% or more, 34% or more, 35% or more, 36% or more, 37% or more, 38% or more, 39% or more, 40% or more. While not wishing to be bound by theory it is believed that the ability to elongation reduces the risk of peeling or separation from the surface of the medical device while in use. Peeling or separation could reduce the efficacy of cleaning and/or disinfection procedures thus creating a potential reservoir for pathogens. The average of elongation may be measured by any suitable method such as, for example, ASTM D882.

In certain aspects, the present patches preferably have an average edge thickness of 10 mil or less, such as 9 mil or less, 8 mil of less, 7 mil or less, 6 mil or less. While not wishing to be bound by theory it is believed that thicker patches can present a risk of peeling or separation from the surface occurring. Peeling or separation could reduce the efficacy of cleaning and/or disinfection procedures thus creating a potential reservoir for pathogens. The edge thickness may be measured by any suitable method such as, for example, using thickness gauges available from Mitutoyo or Mahr.

In certain aspects, the present patches preferably have an adhesion value of at least about 2.5 lbs/inch for at least 7 days after application wherein the temperature is 16-21° C. and the relative humidity is 15-50%. For example, the adhesion value may be 2.6 lbs/inch, 2.7 lbs/inch, 2.8 lbs/inch, 2.9 lbs/inch, 3.0 lbs/inch. While not wishing to be bound by theory it is believed that patches with lower adhesion values can present a risk of peeling or separation from the surface occurring. Peeling or separation could reduce the efficacy of cleaning and/or disinfection procedures thus creating a potential reservoir for pathogens. The adhesion value may be measured by any suitable method such as, for example, ASTM D3330 or PSTC-101.

Health care devices may be subjected to cleaning and disinfection via a number of methods. For example, mattresses on hospital beds may be cleaned with compositions comprising hydrogen peroxide, sodium hypochlorite, ammonium-based cleaning compositions, isopropanol, or the like. In certain embodiments, the present patches are resistant to one or more of such compositions. That is, the performance of the patches in situ is not significantly affected by transitory but repeated exposure to the cleaning solution.

The present patches may be provided in any suitable shape such as, for example, square, rectangle, circle, oval, rhomboid, cross, or the like. The present patches may be provided in a roll or sheet form. In certain embodiments the patch may be trimmed to the desired size before application. The present patches may be provided in any suitable size. For example, the maximum diameter of the present patches may be 1 cm or more, 2 cm or more, 3 cm or more, 4 cm or more, 5 cm or more, 6 cm or more, 7 cm or more, 8 cm or more, 9 cm or more, 10 cm or more, 11 cm or more, 12 cm or more, 13 cm or more, 14 cm or more, 15 cm or more. The maximum diameter of the present patches may be 100 cm or less, 95 cm or less, 90 cm or less, 85 cm or less, 80 cm or less, 75 cm or less.

The present patches may comprise an anti-microbial agent. As used herein, the term "anti-microbial" means the reduction or inhibition of microbial bioburden, colonization, or attachment by microbial organisms. Antimicrobial agents include but not limited to, antibiotics, antiseptics, biocides, or other antimicrobial compounds, such as, for example, silver, silver nanoparticles, ionic silver, combinations of one or more one silver compounds, other metals such as zinc, copper, gold, platinum, and their salts or complexes, for example, zinc undecylenate, quaternary ammonium salts, isoniazid, ethambutol, pyrazinamide, streptomycin, clofazimine, rifabutin, fluoroquinolones, ofloxacin, sparfloxacin, rifampin, azithromycin, clarithromycin, dapsone, tetracycline, erythromycin, ciprofloxacin, doxycycline, ampicillin, amphotericin B, ketoconazole, fluconazole, pyrimethamine, sulfadiazine, clindamycin, lincomycin, pentamidine, atovaquone, paromomycin, diclazaril, acyclovir, trifluorouridine, foscarnet, penicillin, gentamicin, ganciclovir, iatroconazole, miconazole, Zn-pyrithione, chlorohexidine, polyhexamethylenebiguanides, polyhexamethylenebiguanides, triclosan, iodine, iodinepolyvinylpyrrolidone complex, urea-peroxide complex, benzalkonium salts, quaternary ammonium compounds based on saccharinate, algaecides, carbamates, cyanates, turmeric extract, other natural anti-infective compounds and combinations thereof. Anti-microbial agents may be effective against one or more bacteria from the genus *Bordetella, Borrelia, Brucella, Campylobacter, Chlamydia, Chlamydophilia, Clostridium, Corynebacterium, Enterococcus, Escherichia, Francisella, Haemophilus, Helicobacter, Legionella, Leptospira, Listeria, Mycobacterium, Mycoplasma, Neisseria, Pseudomonas, Rickettsia, Salmonella, Shigella, Staphylococcus, Streptococcus, Treponema, Vibrio,* and/or *Yersinia.* For example, *Bordetella pertussis, Borrelia burgdorferi, Brucella abortus, Brucella canis, Brucella melitensis, Brucella suis, Campylobacter jejuni, Chlamydia pneumoniae, Chlamydia trachomatis, Chlamydophila psittaci, Clostridium botulinum, Clostridium difficile, Clostridium perfringens, Clostridium tetani, Corynebacterium diphtheriae, Enterococcus faecalis, Enterococcus faecium, Escherichia coli, Francisella tularensis, Haemophilus influenzae, Helicobacter pylori, Legionella pneumophila, Leptospira interrogans, Listeria monocytogenes, Mycobacterium leprae, Mycobacterium tuberculosis, Mycobacterium ulcerans, Mycoplasma pneumoniae, Pseudomonas aeruginosa, Rickettsia rickettsii, Salmonella typhi, Salmonella typhimurium, Shigella sonnei, Staphylococcus aureus, Staphylococcus epidermidis, Staphylococcus saprophyticus, Streptococcus agalactiae, Streptococcus pneumoniae, Streptococcus pyogenes, Treponema pallidum, Vibrio cholerae, Yersinia pestis,* and the like. It is preferred that the present anti-microbial agent be efficacious against *Escherichia coli, Legionella pneumophila, Streptococcus pneumoniae, Streptococcus pyogenes,* and the like.

The present patches may contain an interlayer film to enhance the rigidity and handling of the invention. This interlayer can be, but not limited to, polyurethane, polyvinyl, polyester, kraft paper, or the like. Such films are available commercially from Adhesive Films. Inc. (New Jersey, USA). Examples from Adhesive films may include, but not limited to, UAF-472 1 mil, UAF-472 2 mil, and PAF-110 2 mil.

The present patches may comprise a release liner and/or a transfer liner on the film layer and/or adhesive layer to protect the patch before use. Such liners may also improve the ease of handling of the patch prior to application to device.

Referring to FIGS. 1A and 1B, an embodiment of a health care device 10 is shown. The health care device 10 may be any device used in a health care environment, such as, for example, beds, tables, stools, wheel chairs, racks, trolleys, stretchers, mattresses, catheter-bags, and other furniture, equipment and articles used in a health care environment. The device 10 generally comprises a surface layer 12 and a supporting layer 14. The surface layer 12 defines at least a portion of the outer surface of the device 10 that may be subject to contact with a person during the use of the device 10. The surface layer 12 may be comprised of any material suitable for a health care environment, such as, for example, while not limited to, nylon, silicone, polyurethane, polyvinyl, polyethylene, polyamides and polyesters. The supporting layer 14 supports the surface layer 12 and may be comprised of any material suitable to provide structural support to the surface layer 12, such as, for example, while not limited to, foam, wood, cotton, plastics, and metals. In the alternative, the device 10 may not comprise a supporting layer 14.

FIGS. 1A and 1B depict a damaged portion 20 of the surface layer 12. The damaged portion 20 may comprise one or more tears, punctures, rips, burns, wear, cracks, and other damage to the surface layer 12. As discussed above, damaged portions 20 of surface layers 12 in health care devices 10 are unattractive, unsanitary and present potential health risks by creating a host or reservoir for infectious agents.

Referring to FIGS. 2A and 2B, one embodiment of an adhesive patch 30 for repairing damaged surfaces of a health care device 10 is shown. The patch 30 is applied to the surface layer 12 of the device 10 to cover the damaged portion 20 and adhere to the surface layer 12. The patch 30 is configured to be suitable for application in health care environments. In particular, amongst other suitable properties for a health care environment, the patch 30 may comprise one or more of the following properties: physical properties, including, adhesion, anti-decubitus, heat-resistance, resistance to ultraviolet radiation, durability, flexibility, stretchable, breathability, cleanability, resistance to chemical cleaning products; anti-microbial properties, hypoallergenic and non-cytotoxic properties. The patch 30 comprises an adhesive layer 34 and a film layer 32.

Referring to FIGS. 3A and 3B, the patch 30 generally comprises a film layer 32, a peel-off layer 36, and an adhesive layer 34 disposed in between the film layer 32 and peel-off layer 36. Prior to application of the patch 30 to a health care device 10, the adhesive layer 34 functions to adhere the film layer 32 and peel-off layer 36 into a unitary patch 30. The film layer 32 and peel-off layer 36 protect the adhesive layer 34 and prevent the adhesive layer 34 from adhering to other objects. During application of the patch 30 to the device 10, the peel-off layer 36 is removed from the patch 30 and the adhesive layer 34 functions to adhere the film layer 32 to the surface layer 12 of the device 10. The adhesive layer 34 may be comprised of any suitable adhesive suitable for a health care environment, such as, for example, acrylic, silicone. In particular, amongst other suitable properties for a health care environment, the adhesive layer 34 may comprise one or more of the following properties: physical properties, including, adhesion to film layer and device surface, heat-resistance, pressure-resistance, resistance to ultraviolet radiation, durability, flexibility, cleanability, resistance to cleaning products, plasticizer resistant, anti-microbial properties, hypoallergenic and non-cytotoxic properties.

The film layer 32 comprises a top surface 42 and a bottom surface 44. The top surface 42 is an externally facing surface that may be subject to contact with a person during use of the device 10; while the bottom surface 44 is an interior surface that is adhered by the adhesive layer 34, adhesive layer 34, adhesive layer 34 is also adhered to the top layer 46 of the peel-off layer 36, which prior to application of the patch 30 to the device 10 the peel-off-layer 36 is removed from the adhesive layer 34, and is adhered by the adhesive layer 34 to the surface layer 12 of the device 10 during application of the patch 30 to the device 10. The film layer 32 may be comprised of any material suitable for a health care environment, such as, for example, nylon, silicone, polyurethane, polyvinyl, polyethylene, polyamides and polyesters. In particular, amongst other suitable properties for a health care environment, the film layer 32 may comprise one or more of the following properties: physical properties, including, adhesion or bonding to the adhesive, anti-decubitus, heat-resistance, resistance to ultraviolet radiation, durability, flexibility, stretchable, breathability, cleanability, resistance to chemical cleaning products; anti-microbial properties, hypoallergenic and non-cytotoxic properties.

The peel-off layer 36 comprises a top surface 46 and a bottom surface 48. The top surface 46 is an internal surface that is adhered by the adhesive layer 34 to the bottom surface 44 of the film layer 32, prior to application of the patch 30 to the device 10 and peel-off layer 36 is removed from top surface 46 during application of the patch 30 to the device 10. The peel-off layer 36 may be comprised of any material suitable to be removably adhered to the film layer 32 by the adhesive layer 34, such as, for example, kraft paper or polyester.

The present disclosure provides health care devices comprising a patch according to the present invention. The present disclosure provides a mattress comprising a patch according to the present invention.

The present disclosure provides the use of a patch as described herein for repairing the surface of a health care device such as a mattress. Said use comprises applying the patch over the damaged portion of the surface of the health care device.

The present disclosure provides a method of repairing the surface of health care device by applying a patch according to the present invention over a damaged portion of the surface. The patch may comprising a film layer and an adhesive layer. The patch may comprise an anti-microbial agent. The patch may comprise one or more of the following properties: adhesion, heat-resistance, pressure-resistance, resistance to ultraviolet radiation, durability, flexibility, cleanability, resistance to cleaning products; anti-microbial, wound healing, hypoallergenic and non-cytotoxic properties. The film layer may comprise a polyvinyl, polyurethane, or the like. The adhesive layer may comprise an acrylic, silicone, or the like. The patch may comprise a peel-off layer removably adhered to the film layer by the adhesive layer.

It is contemplated that the different parts of the present description may be combined in any suitable manner. For instance, the present examples, methods, aspects, embodiments or the like may be suitably implemented or combined with any other embodiment, method, example or aspect of the invention.

Unless defined otherwise, all technical and scientific terms used herein have the same meaning as is commonly understood by one of ordinary skill in the art to which this invention belongs. Unless otherwise specified, all patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference. Citation of references herein is not to be construed nor considered as an admission that such references are prior art to the present invention.

Use of examples in the specification, including examples of terms, is for illustrative purposes only and is not intended to limit the scope and meaning of the embodiments of the invention herein. Numeric ranges are inclusive of the numbers defining the range. In the specification, the word "comprising" is used as an open-ended term, substantially equivalent to the phrase "including, but not limited to," and the word "comprises" has a corresponding meaning.

The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

The present invention will be further illustrated in the following examples. However it is to be understood that these examples are for illustrative purposes only, and should not be used to limit the scope of the present invention in any manner.

Examples 28 different prototypes were developed based on a combination of 13 commercially available film layers and 9 commercially available adhesives layers. These prototypes were evaluated for their suitability in repairing damaged portions of the surfaces of health care devices. The film and adhesive layers were combined using standard manufacturing techniques.

Patches were evaluated for their ability to withstand standard hospital cleaning products.

Table 1 compares patch (Dartex+acrylic PSA, 3M and Adchem) relative to other tested compositions and that which is commercially available (Tear-Aid). Physical damages (cracking, shrinking, wrinkling) was observed for the material tested after 1 hour of immersion in the four chemicals (5.5% Sodium Hypochlorite, 7% Hydrogen Peroxide, 70% Isopropanol, Ammonium Chloride).

TABLE 1

| Film | Adhesive | Surface | Sodium Hypochlorite (5.5%) | Hydrogen Peroxide (7%) | Isopropanol (70%) | Ammonium Chloride |
|---|---|---|---|---|---|---|
| Argotex PU 2 mil | Flexmark TT200 | Mattress Cover | Yes | n/a | Yes | n/a |
| Flexcon V400 | 3M 9465U | Mattress Cover | n/a | n/a | Yes | n/a |
| Flexon V400 | Flexmark TT200 | Mattress Cover | No | Yes | Yes | n/a |
| ETC 3 mil PU | Flexmark TT200 | Mattress Cover | Yes | Yes | Yes | n/a |
| Argotex PU 2 mil | 3M 9465U | Mattress Cover | n/a | n/a | Yes | n/a |
| ETC 3 mil PU | 3M 9465U | Mattress Cover | No | No | Yes | No |
| M.A.T.T.2.5 GA PU | COL-RZO02 | Mattress Cover | n/a | n/a | Yes | n/a |
| M.A.T.T.3.0GA Vinyl | COL-ACR003 | Mattress Cover | n/a | n/a | Yes | n/a |
| M.A.T.T.3.5GA Vinyl | COL-RZO02 | Mattress Cover | n/a | n/a | Yes | n/a |
| ETC 3 mil PU | AdChem 730 | Mattress Cover | No | Yes | Yes | No |
| ETC 4 mil PU | AdChem 730 | Mattress Cover | No | Yes | Yes | No |
| DermaMed 4 mil | 3M9465U | Mattress Cover | No | No | No | No |
| Dartex TC84 | 3M9465U | Mattress Cover | No | No | No | No |
| Dartex TC84 | AdChem 7833 | Mattress Cover | No | No | No | No |
| Tear-Aid | | Mattress Cover | No | Yes | Yes | No |
| Masta Plasta | | Mattress Cover | Yes | Yes | Yes | Yes |
| Duct Tape | | Mattress Cover | n/a | n/a | Yes | n/a |

The patch may comprise an antimicrobial additive. Table 2 summarizes the presence or absence of an additive for a sample of patches.

TABLE 2

| Composition | Additive (film/adhesive) |
|---|---|
| Dartex TC84/Adchem 7833 | Yes/Yes |
| DartexTC84/3M 9465U | Yes/No |
| Tear-Aid | No/No |
| MastaPlasta | No/No |
| Duct Tape | No/No |

The patch may have a thickness of 10 mil or less after application to the health care device. Table 3 summarizes the thickness of a sample of patches.

TABLE 3

| Composition | Thickness |
|---|---|
| Dartex TC84/Adchem 7833 | (5 mil) |
| DartexTC84/3M 9465U | (7 mil) |
| Tear-Aid | (12 mil) |
| MastaPlasta | (>20 mil) |
| Duct Tape | (8 mil) |

The adhesive is preferably non-cytotoxic, hypoallergenic, and/or resistant to microbial growth. Table 4 summarizes these characteristics for certain adhesives.

TABLE 4

| Composition | Non-Cytotoxcitiy |
|---|---|
| Adchem 7833 | Yes |
| 3M 9465U | No |
| Tear-Aid | No |
| MastaPlasta | No |
| FlexconTT200 | No |
| Adchem 730 | No |
| ACR007 | Yes |
| ACR003 | Yes |
| RZ002 | Yes |

| Composition | Hypoallergenic |
|---|---|
| Adchem 7833 | Yes |
| 3M 9465U | No |

TABLE 4-continued

| | |
|---|---|
| Tear-Aid | No |
| MastaPlasta | No |
| FlexconTT200 | No |
| Adchem 730 | No |
| ACR007 | Yes |
| ACR003 | Yes |
| RZ002 | Yes |

| | Microbial Growth | | |
|---|---|---|---|
| Sample | *S. aureus* | *P. aeruginosa* | *A. brasiliensis* |
| Control | Heavy Growth | Heavy Growth | Heavy Growth |
| 3M9465U | No Growth | No Growth | No Growth |
| Tear-Aid Adhesive | Minimal Growth | Minimal Growth | Minimal Growth |

The film layer is preferably non-cytotoxic, hypoallergenic, and/or resistant to microbial growth. Table 5 summarizes these characteristics for certain films.

TABLE 5

| Composition | Non-Cytotoxic |
|---|---|
| Dartex | Yes |
| Tear-Aid | No |
| MastaPlasta | No |
| ETC PU (3 mil, 4 mil, 6 mil) | Yes |
| 3M7931 | No |
| DermaMed4mil | Yes |
| Argotex2mil | No |
| FlexconV400/V600 | No |

| Composition | Hypoallergenic |
|---|---|
| Dartex | Yes |
| Tear-Aid | No |
| MastaPlasta | No |
| ETC PU (3 mil, 4 mil, 6 mil) | Yes |
| 3M7931 | No |
| DermaMed4mil | Yes |
| Argotex2mil | No |
| FlexconV400/V600 | No |

TABLE 5-continued

|  | Microbial Growth* | | |
| --- | --- | --- | --- |
| Sample | S aureus | P aeruginosa | Abrasiliensis |
| Control | Heavy Growth | Heavy Growth | Heavy Growth |
| DartextTC84 | No Growth | No Growth | Minimal Growth |
| Tear-Aid | No Growth | No Growth | Minimal Growth |

*microbial growth rate of less than 10% based on test standard ASTM G21

The adhesion value of the patch to the device is preferably 2.5 lbs/inch or greater 7 days after application at 16-21° C. and relative humidity of 15-50% relative humidity. Table 6 summarizes the performance of certain patches.

TABLE 6

|  |  | 180 degree Peel (lbs/in) | | | |
| --- | --- | --- | --- | --- | --- |
| Condition | Test Surface | Adchem 730 | Adcem 7833 | 3M9465U | Tear-Aid |
| 1 day @RT | Stainless Steel | 5.9 | 3.9 | 3.3 | 5.2 |
| 1 day @RT | Mattress Surface | 3.0 | 2.0 | 2.4 | n/a |
| 7 day @RT | Stainless Steel | 9.1 | 4.9 | 4.4 | n/a |
| 7 day @RT | Mattress Surface | 6.5 | 2.7 | 3.2 | n/a |
| 7 day @ 150 | Stainless Steel | 9.1 | 6.9 | 7.7 | n/a |
| 7 day @ 150 | Mattress Surface | 3.6 | 3.8 | 4.6 | n/a |

In summary, 2 samples made from the film Dartex TC84 and the adhesive Adchem 7833 or 3M9465 were found to perform best against a variety of criteria required to be a function patch for the repair and regeneration of surface integrity on mattresses or other planar surfaces in a health care environment.

The invention claimed is:

1. A repair patch for repairing a damaged surface of a device, said patch comprising a film layer and a permanent adhesive layer, wherein the permanent adhesive layer is between the film layer and the damaged surface and is applied directly to the damaged surface, the permanent adhesive layer has an adhesion value between the permanent adhesive layer and the damaged surface to which the patch is applied of 2.5 lbs/in or greater 7 days after application at a temperature of 16-21° C. to reduce the risk of peeling or separation of the patch from the damaged surface, and wherein the adhesion value is measured by ASTM D3330, wherein the permanent adhesive layer comprises an acrylic pressure sensitive adhesive that is plasticizer resistant.

2. The repair patch of claim 1, wherein the patch has an average edge thickness of 10 mil or less.

3. The repair patch of claim 1, wherein said film layer includes a material selected from the group consisting of polyethylene, polyurethane, polypropylene, nylon, silicone, polyamide, polyester, and polyvinyl.

4. The repair patch of claim 1, further comprising an interlayer film interposed between the film layer and the permanent adhesive layer.

5. The patch of claim 4, wherein the interlayer film is comprised of a material selected from the group consisting of polyurethane, polyvinyl, and polyester.

6. The repair patch of claim 1, wherein the film layer is adhered or bonded to the permanent adhesive layer, and wherein the adhesion value is 3.3 lbs/in or greater.

7. The repair patch of claim 1, wherein the film layer is adhered or bonded to the permanent adhesive layer, and wherein the adhesion value is 2.8 lbs/in or greater.

8. The repair patch of claim 1, wherein the film layer comprises a polyurethane.

9. The repair patch of claim 1, wherein the film layer comprises a polyurethane film containing a flame retardant.

10. A method of repairing a damaged planar surface of a health care device, the method comprising applying the repair patch of claim 1 to the damaged planar surface, such that the patch covers a damaged portion of the damaged planar surface.

11. The method of claim 10, wherein the healthcare device is selected from the group consisting of mattresses, patient exam tables, chairs, stretchers, cots, and treatment beds.

* * * * *